United States Patent [19]

Portman

[11] Patent Number: 5,096,271
[45] Date of Patent: Mar. 17, 1992

[54] DRIVE ASSEMBLY, POWER OFF RETRACT

[75] Inventor: John R. Portman, Anaheim, Calif.

[73] Assignee: Sony Trans Com, Inc., Irvine, Calif.

[21] Appl. No.: 677,255

[22] Filed: Mar. 29, 1991

[51] Int. Cl.$^5$ ............................................. A47B 67/02
[52] U.S. Cl. ..................................... 312/7.2; 312/248; 312/325; 244/118.5
[58] Field of Search ................. 312/248, 319, 7.1, 7.2, 312/325, 326; 244/118.5

[56] References Cited

U.S. PATENT DOCUMENTS 4,883,242 11/1989 Becker et al. .................... 244/118.5
4,915,461 4/1990 Kingsborough et al. ...... 312/319 X
4,995,680 2/1991 Miruri .................................. 312/7.1

Primary Examiner—Joseph Falk
Attorney, Agent, or Firm—Blakely Sokoloff Taylor & Zafman

[57] ABSTRACT

A display unit that rotates a video monitor between a stowing cavity and an exposed position so that viewers can see the monitor. The monitor is attached to a frame which is typically mounted into the ceiling of the passenger cabin of an airplane. Also attached to the frame is an electric motor that rotates the monitor into the stowed and exposed positions. Attached to the output shaft of the electric motor is a slip clutch that allows the monitor to rotate up from the exposed position when a predetermined force is applied to the viewing device. A spring is operatively connected to the monitor and electric motor, that pulls the monitor up into the stowed position if the electric motor becomes disabled. An electric brake is also attached to the output shaft of the electric motor to hold the monitor in the exposed position.

20 Claims, 2 Drawing Sheets

DRIVE ASSEMBLY, POWER OFF RETRACT

BACKGROUND OF THE INVENTION

1. Field of the Invention

The present invention relates to video display units that can stow and display a monitor.

2. Description of Related Art

To provide added comfort to the passengers in an airplane, the plane can be provided with television monitors that display movies and other programming. The monitors are usually stowed in a cavity in the ceiling of the passenger cabin. The monitors are typically attached to a hinge that allows the monitors to be rotated down into a viewing position. An actuator and a corresponding electric motor are attached to each monitor to rotate the same in and out of the compartment cavity. On occasion the cabin will lose electrical power, in which case it is desirable to retract the monitors into the stowed position. The Federal Aviation Administration (FAA) requires that all monitors be concealed when the cabin loses power, to insure the passengers safety.

Because the monitors protrude from the cabin ceiling, there is a likelihood that a passenger will hit the monitor and possibly injure himself and damage the monitor. The probability of this occurring greatly increases if the monitor is located directly above the passenger seats. It would therefore be desirable to have a monitor that will absorb a collision between a passenger and the viewing device. It would also be desirable to have a monitor rotation assembly that would automatically retract the monitor when electrical power is lost in the passenger cabin.

SUMMARY OF THE INVENTION

The present invention is a display unit that rotates a video monitor between a stowing cavity and an exposed position, so that viewers may see the monitor. The monitor is attached to a frame that is typically mounted into the bag bin of the passenger cabin of an airplane. Also attached to the frame is an electric motor that rotates the monitor into the stowed and exposed positions. Attached to the output shaft of the electric motor is a slip clutch that allows the monitor to rotate up from the exposed position when a predetermined force is applied to the viewing device. Thus when a passenger collides with the monitor, the clutch allows the monitor to rotate up into the stowing cavity, decreasing the amount of injury to the passenger and the damage to the monitor and motor.

A spring is operatively connected to the monitor and electric motor, that pulls the monitor up into the stowed position if the electric motor becomes disabled. The spring is preferably a preloaded torsional spring, that is wound even further when the monitor is rotated into the exposed position by the motor. An electric brake is also attached to the output shaft of the electric motor to hold the monitor in the exposed position. When the motor and brake lose power, the stored energy within the spring automatically rotates the monitor back up into the stowed position.

Therefore it is an object of this invention to provide a display unit that automatically retracts a viewing monitor when the unit loses electrical power.

It is also an object of this invention to provide a display unit that allows a monitor to retract when a predetermined force is applied to the monitor.

BRIEF DESCRIPTION OF THE DRAWINGS

The objects and advantages Of the present invention will become more readily apparent to those skilled in the art after reviewing the following detailed description and accompanying drawings, wherein.

DETAILED DESCRIPTION OF THE INVENTION

Figure 1:
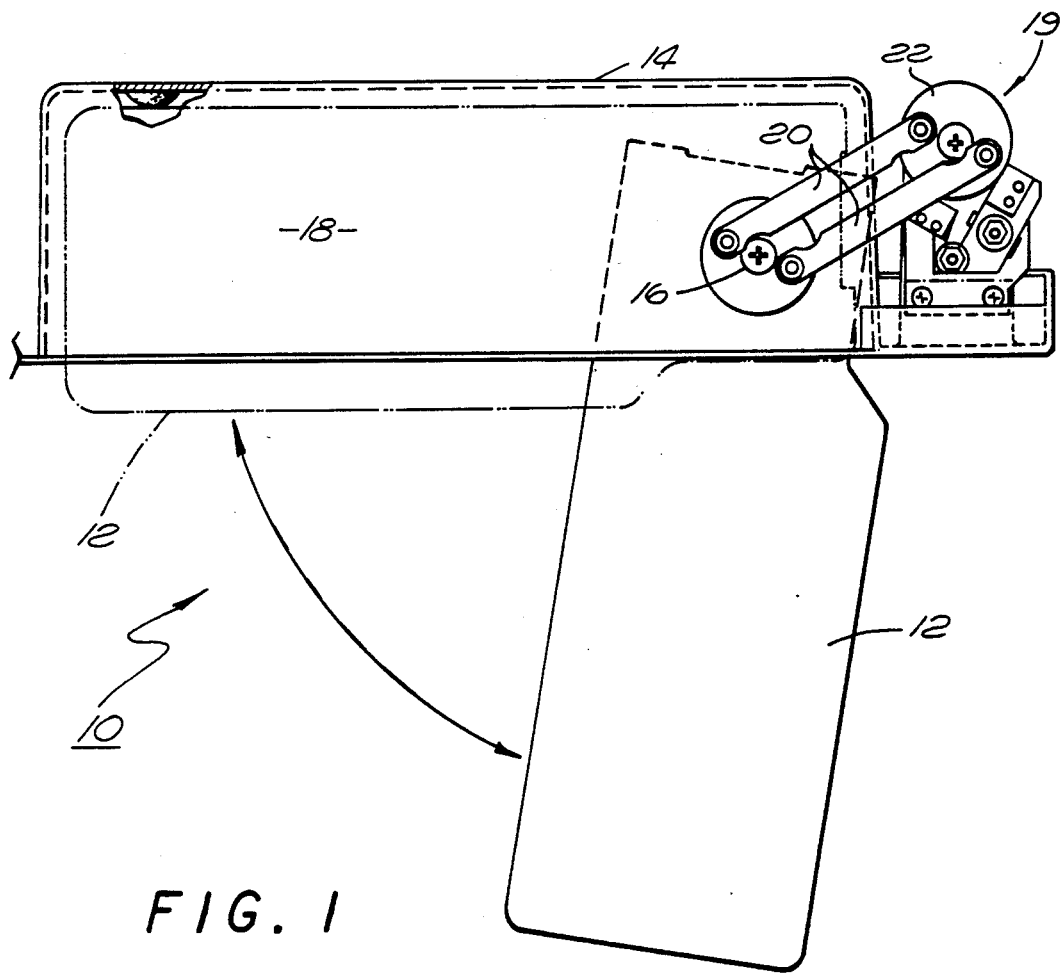
FIG. 1 is a side view of the display unit of the present invention showing a monitor in an exposed position.
Figure 2:
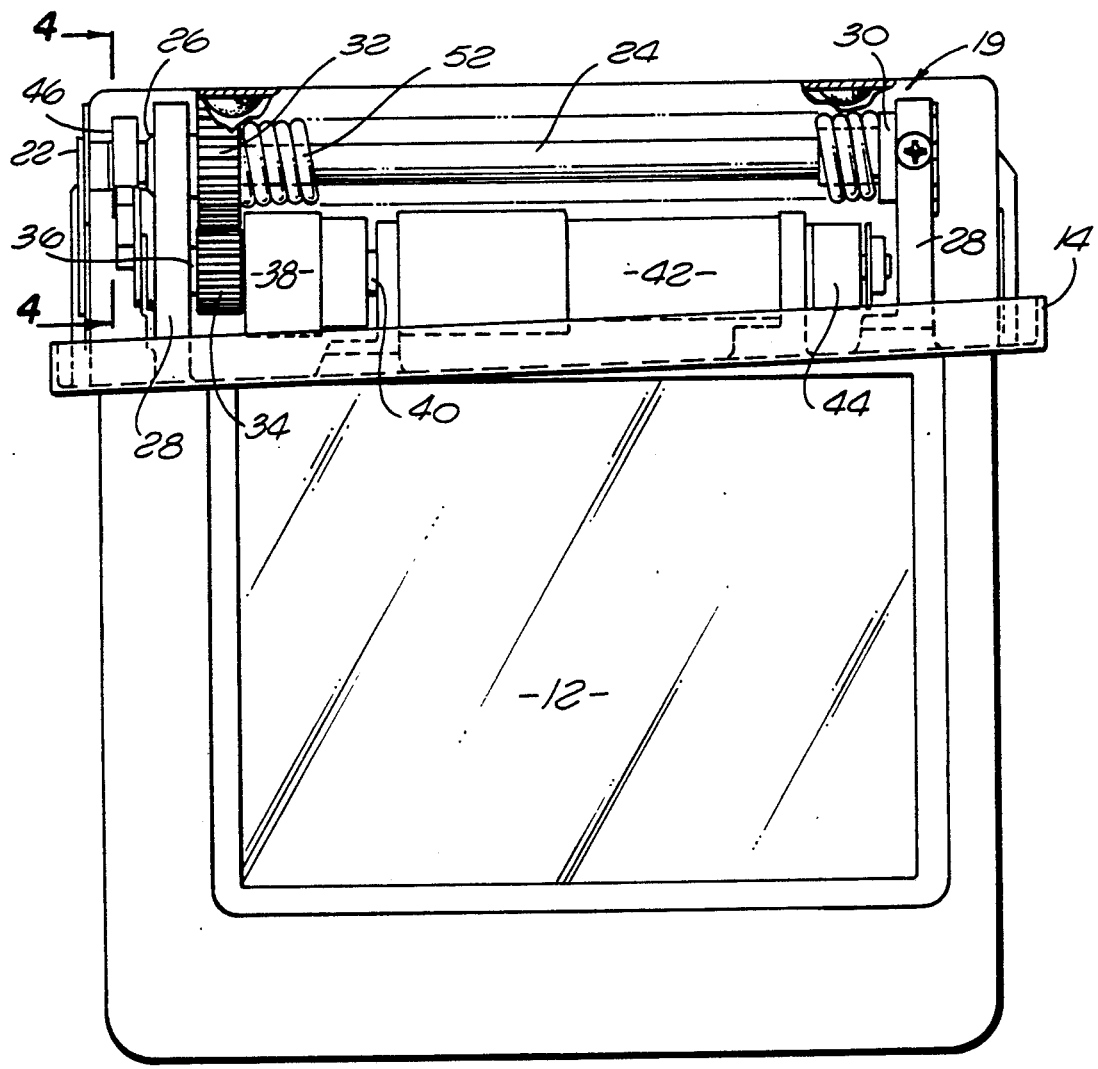
FIG. 2 is a front view of the display unit of FIG. 1 showing a monitor drive assembly and spring attached to the frame of the unit.

Referring to the drawings more particularly by reference numbers, FIG. 1 shows a display unit 10 of the present invention. The unit 10 has a video monitor 12 that is pivotally connected to a frame 14, by a pair of first bearings 16 that extend through side members 18 of the frame 14 and are attached to the monitor 12. The monitor may be any type of video display device such as the 8.6 inch liquid crystal display screen sold by Sony Corp. One of the bearings 16 is connected to a drive assembly 19 by a pair of linkage arms 20 that is attached to an output hub 22 of the assembly 19. The arms 20 are arranged such that any rotation of the output hub 22 is translated into a corresponding rotation of the bearing 16 and monitor 12. As shown in FIG. 2, the drive assembly 19 has a spring output shaft 24 connected to the output hub 22. The shaft 24 is supported at one end by a second bearing 26 that is attached to a mounting bracket 28 extending from the frame 14. The shaft 24 can rotate relative to the bearing 26 and mounting frame 28. At the other end of the shaft 24 is a third bearing 30 supported by another mounting bracket 28, such that the shaft 24 can rotate relative to the mounting bracket 28. The combination of bearings 26 and 30, allow the shaft 24 to rotate relative to the frame 14.

Figure 4:
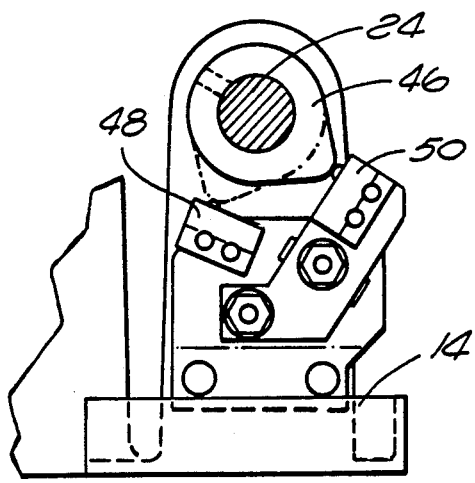
FIG. 4 is a side view of the display unit of FIG. 2 showing a cam that rotates between two micromotion switches.

Attached to the shaft 24 is a first gear 32 that meshes with a second gear 34, which is attached to the output shaft 36 of a slip clutch 38. The slip clutch 38 is connected to the output shaft 40 of an electric gear motor 42. Also attached to the motor output shaft 40 is a magnetic brake 44. The monitor 12 is normally in a first or stowed position, wherein the monitor is parallel with the frame 14. To expose the monitor 12, power is supplied to the electric motor 42 which rotates the gears, spring shaft and bearing 16, so that the monitor 12 rotates into a second or exposed position which is essentially perpendicular to the frame 14. As shown in FIG. 4, the spring shaft 24 also has a cam 46 that rotates with the shaft 24 between first 48 and second 50 micromotion switches that are attached to the frame 14. The micromotion switches sense when the monitor 12 is in either the first or second positions. When the cam 46 rotates to the second switch 50 a signal is sent to a relay that turns off the power to the electrical motor 42 and provides power to the brake 44. The brake 44 holds the monitor 12 in the exposed position until power to the brake 44 is transferred back to the motor 42, which then lifts the monitor 12 into the stowed position. The slip clutch 38 is constructed so that when a predetermined amount of force is applied to the monitor 12, the clutch 38 disengages the output shaft 40 of the electric motor 42 from the drive assembly 19, allowing the monitor 12 to freely rotate from the second position. The clutch 38 provides a collapsible monitor display unit. Thus if a viewer were to strike his head on the monitor 12, the clutch 38 would allow the monitor 12 to retract and absorb some of the force.

A torsional spring 52 can be incorporated into the drive assembly 19, by attaching one end of the spring 52 to the third bearing 30 and the other end to the spring output shaft 24. When the electric motor 42 rotates the monitor 12 into the second position, the spring 52 is turned by the spring output shaft 24. The brake 44 should be constructed to overcome the counteracting torque of the spring 52 that is created when the monitor 12 is rotated into the second position. In the event the electric motor 42 fails, or if power to the motor 42 and brake 44 is lost, the potential energy stored in the spring 52 will rotate the monitor 12 back into the stowed position. The spring 52 thus provides a back up mechanism to lift the monitor 12 in the stowed position if the motor 42 and/or brake 44 become disabled. The spring 52 should preferably have a preload so that the spring is capable of holding the monitor 12 in the stowed position. By gearing the spring 52 to the motor 42, the motor 42 acts as an inertia limiting device that slows down the monitor 12 as the spring 52 rotates the viewing device 12 from the second to the first position. As an alternative method of using the display unit 10, retraction of the monitor 12 could be provided by merely disengaging the brake 44 and allowing the spring 52 to pull up the monitor 12 without using the motor 42.

Figure 3:
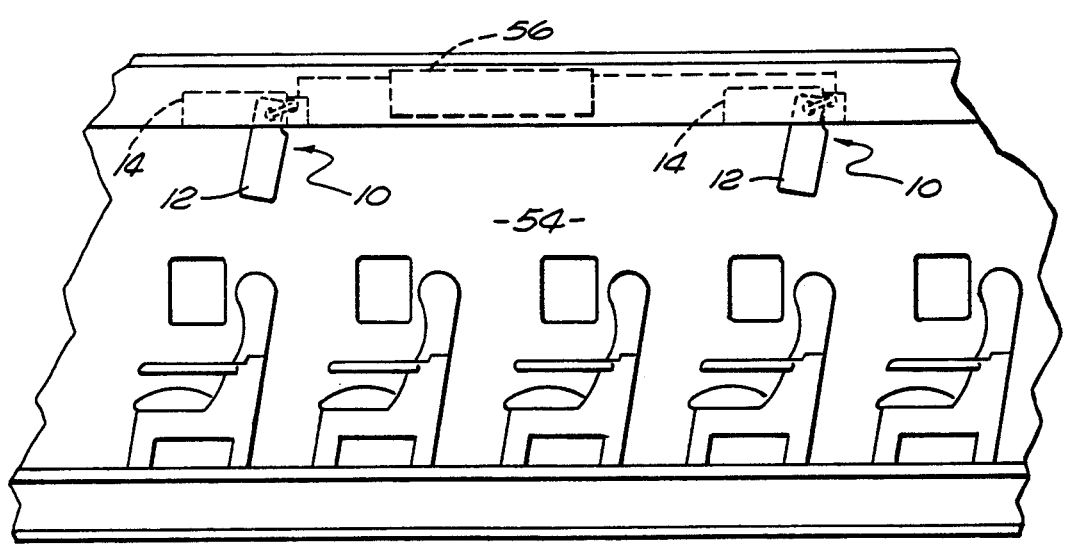
FIG. 3 is a side view of a display unit of the present invention installed in an airplane.

FIG. 3 shows the display unit 10 assembled into the passenger cabin 54 of an airplane. The frame 14 is preferably mounted into a ceiling or bag bin cavity above the passenger seating area. The units can be spaced apart every three rows of seats, so that the monitors 12 are viewable by the passengers. The units 10 can be connected to a computer 56, which is attached to one or more video cassette recorders (VCR's). The micromotion switches 48 and 50, provide first and second signals to the computer 56 to indicate whether the monitors 12 are up or down. At a predetermined time during the flight, the computer 56 can relay or provide power to the electric motor 42 to rotate the monitors 12 down into the exposed position. When the monitors 12 are in the second position, the second switches 50 send the second signals to the computer 56, which then switches on a VCR that sends a taped message or program to the monitors 12. There may be two or three VCR's each having a different tape, wherein the computer 56 plays and stops each VCR in sequence according to a computer program. The display units and computer may be connected so that the monitors are divided into zones, wherein one group or zone of monitors plays one tape and another zone plays a different tape, allowing the passengers to simultaneously view different programming.

While certain exemplary embodiments have been described in detail and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A display unit attached to a structure comprising:
a frame attached to the structure, said frame defining a storage cavity;
a monitor operatively connected to said frame such that said monitor can rotate between a first position and a second position relative to said frame, wherein said monitor is stowed within said storage cavity in said first position and said monitor is positioned substantially outside said storage cavity exposed to a viewer in said second position such that the viewer can view said monitor;
actuation means operatively connected to said monitor for rotating said monitor between said first and second positions; and,
clutch means operatively connected to said monitor and said actuation means for allowing said monitor to rotate from said second position to said first position in response to a predetermined level of external force applied to said monitor.

2. The display unit as recited in claim 1, further comprising a spring operatively connected to said monitor and said actuation means, such that said spring is turned a predetermined number of turns when said actuation means moves said monitor from said first position to said second position, said spring being constructed such that said spring can move said monitor from said second position to said first position.

3. The display unit as recited in claim 2, wherein said spring is a torsional spring preloaded to support said monitor in said first position.

4. The display unit as recited in claim 1, wherein said actuation means include an electric motor adapted to move said monitor between said first and second positions.

5. The display unit as recited in claim 4, wherein said actuation means include an electric brake operatively connected to said electric motor adapted to hold said monitor in said second position.

6. The display unit as recited in claim 1, further comprising sensing means for sensing when said monitor is in said first and second positions.

7. The display unit as recited in claim 6, further comprising a computer operatively connected to said sensing means that receives a first signal from said sensing means when said monitor is in said first position and a second signal from said sensing means when said monitor is in said second position, said computer relays a video display to said monitor when said monitor is in said second position.

8. The display unit as recited in claim 1, wherein said monitor is pivotally attached to said frame such that said monitor rotates between said first and second positions.

9. The display unit as recited in claim 1, wherein said monitor is a liquid crystal display monitor.

10. A display unit attached to a structure comprising:
a frame attached to the structure, said frame defining a storage cavity;
a monitor pivotally connected to said frame such that said monitor can rotate between a first position and a second position relative to said frame, wherein said monitor is stowed within said storage cavity in said first position and said monitor is positioned substantially outside said storage cavity exposed to a viewer in said second position such that the viewer can view said monitor;
actuation means operatively connected to said monitor for rotating said monitor between said first and said second positions;

a spring operatively connected to said monitor and said actuation means, such that said spring is turned a predetermined number of turns when said actuation means rotates said monitor from said first position to said second position, said spring being constructed such that said spring can rotate said monitor from said second position to said first position; and, clutch means operatively connected to said monitor and said actuation means for allowing said monitor to rotate from said second position to said first position in response to a predetermined level of external force applied to said monitor.

11. The display unit as recited in claim 10, wherein said actuation means include an electric motor adapted to move said monitor between said first and second positions.

12. The display unit as recited in claim 11, wherein said actuation means include an electric brake operatively connected to said electric motor adapted to hold said monitor in said second position.

13. The display unit as recited in claim 12, further comprising sensing means for sensing when said monitor is in said first and second positions.

14. The display unit as recited in claim 13, further comprising a computer operatively connected to said sensing means that receives a first signal from said sensing means when said monitor is in said first position and a second signal from said sensing means when said monitor is in said second position, said computer relays a video display to said monitor when said monitor is in said second position.

15. The display unit as recited in claim 13, wherein said spring is a torsional spring preloaded to support said monitor in said first position.

16. The display unit as recited in claim 15, wherein said monitor is a liquid crystal display monitor.

17. A display unit attached to a passenger cabin of an airplane comprising:

a frame attached to the passenger cabin, said frame defining a storage cavity;

a monitor pivotally connected to said frame such that said monitor can rotate between a first position and a second position relative to said frame, wherein said monitor is stowed within said storage cavity in said first position and said monitor is positioned substantially outside said storage cavity exposed to a viewer in said second position such that the viewer can view said monitor;

an electric motor attached to said frame, said electric motor having an output shaft capable of rotating in either a clockwise or a counterclockwise direction;

sensing means operatively connected to said monitor for sensing when said monitor is in said first position and said second position;

an electric brake operatively connected to said electric motor and said sensing means that prevents said output shaft from rotating when said monitor is in said second position;

coupling means operatively connected to said output shaft and said monitor for rotating said monitor between said first and second positions when said output shaft is rotated by said electric motor;

a spring operatively connected to said coupling means such that said spring is turned a predetermined number of turns when said electric motor rotates said monitor from said first position to said second position, said spring being constructed to rotate said monitor from said second position to said first position if said electric motor becomes inoperative; and, clutch means operatively connected to said monitor and said output shaft of said electric motor for allowing said monitor to rotate from said second position to said first position in response to a predetermined level of external force applied to said monitor.

18. The display unit as recited in claim 17, wherein said coupling means includes; a spring shaft mechanically coupled to said monitor, a first gear attached to said spring shaft and intermeshed with a second gear attached to said output shaft of said electric motor, wherein said rotation of said output shaft turns said gears and rotates said spring shaft and said monitor.

19. The display unit as recited in claim 18, further comprising a computer operatively connected to said sensing means that receives a first signal from said sensing means when said monitor is in said first position and a second signal from said sensing means when said monitor is in said second position, said computer relays a video display to said monitor when said monitor is in said second position.

20. The display unit as recited in claim 19, wherein said monitor is a liquid crystal display monitor.

* * * * *